United States Patent

Su et al.

(10) Patent No.: US 11,531,130 B2
(45) Date of Patent: Dec. 20, 2022

(54) SEISMIC FULL HORIZON TRACKING METHOD, COMPUTER DEVICE AND COMPUTER-READABLE STORAGE MEDIUM

(71) Applicant: PetroChina Company Limited, Beijing (CN)

(72) Inventors: Mingjun Su, Beijing (CN); Zhong Hong, Beijing (CN); Qingyun Han, Beijing (CN); Tao Deng, Beijing (CN); Xiangli Cui, Beijing (CN); Feng Qian, Beijing (CN); Guangmin Hu, Beijing (CN); Yunze Xu, Beijing (CN)

(73) Assignee: PETROCHINA COMPANY LIMITED, Beijing (CN)

( * ) Notice: Subject to any disclaimer, the term of this patent is extended or adjusted under 35 U.S.C. 154(b) by 296 days.

(21) Appl. No.: 16/843,152

(22) Filed: Apr. 8, 2020

(65) Prior Publication Data

US 2020/0326442 A1 Oct. 15, 2020

(30) Foreign Application Priority Data

Apr. 9, 2019 (CN) .......................... 201910280939.0

(51) Int. Cl.
*G06K 9/00* (2022.01)
*G01V 1/34* (2006.01)
*G06K 9/62* (2022.01)

(52) U.S. Cl.
CPC ............. *G01V 1/345* (2013.01); *G06K 9/629* (2013.01); *G06K 9/6289* (2013.01)

(58) Field of Classification Search
CPC .. G01V 2210/643; G01V 1/345; G01V 1/301; G01V 2210/642; G01V 2210/641;
(Continued)

(56) References Cited

U.S. PATENT DOCUMENTS 9,214,041 B2 * 12/2015 Zinck ...................... G06T 17/05
2010/0214870 A1 * 8/2010 Pepper ..................... G06T 7/187
367/72
(Continued)

FOREIGN PATENT DOCUMENTS

CN 1797039 A 7/2006
CN 102053270 A 5/2011
(Continued)

OTHER PUBLICATIONS

Hoyes, Jack, and Thibaut Cheret. "A review of "global" interpretation methods for automated 3D horizon picking." The Leading Edge 30.1 (2011): 38-47. (Year: 2011).*

(Continued)

*Primary Examiner* — Avinash Yentrapati
(74) *Attorney, Agent, or Firm* — The Dobrusin Law Firm, P.C.; Bryan S. Lemanski

(57) ABSTRACT

There is disclosed in the present disclosure a seismic full horizon tracking method, a computer device and a computer-readable storage medium. The method includes: acquiring three-dimensional seismic data; extracting horizon extreme points from the three-dimensional seismic data to construct a sample space; equally dividing the sample space into a plurality of sub-spaces with overlapping portions, and performing a clustering process on the horizon extreme points in each sub-space to obtain horizon fragments corresponding to each horizon of the three-dimensional seismic data; establishing a topological consistency between the horizon fragments; and fusing the horizon fragments corresponding to each horizon of the three-dimensional seismic data based on the topological consistency, to obtain a full horizon tracking result of the three-dimensional seismic data. In the disclosure, a layer crossing phenomenon occurring in seis- (Continued)

mic full horizon tracking can be avoided, and a better full horizon tracking effect can be achieved.

20 Claims, 8 Drawing Sheets

(58) Field of Classification Search
CPC ........... G01V 2210/64; G01V 2210/63; G01V 2210/61; G01V 2210/62; G01V 2210/646; G06K 9/6218; G06K 9/6247; G06K 9/6289; G06K 9/629
See application file for complete search history.

(56) References Cited

U.S. PATENT DOCUMENTS

| | | | |
|---|---|---|---|
| 2011/0247829 A1 | 10/2011 | Dobin et al. | |
| 2012/0254781 A1 | 10/2012 | Larsen et al. | |
| 2013/0151161 A1* | 6/2013 | Imhof | G01V 1/301 |
| | | | 702/14 |
| 2020/0049847 A1* | 2/2020 | Nguyen | G06T 11/00 |

FOREIGN PATENT DOCUMENTS

| | | |
|---|---|---|
| CN | 102819688 A | 12/2012 |
| CN | 102981182 A | 3/2013 |
| CN | 103412331 A | 11/2013 |
| CN | 103592681 A | 2/2014 |
| CN | 103901467 A | 7/2014 |
| CN | 104199092 A | 12/2014 |
| CN | 102066980 A | 2/2015 |
| CN | 105223609 A | 1/2016 |
| WO | 2014023737 A | 2/2014 |

OTHER PUBLICATIONS

Chinese Search Report, Application No. 201910280939.0, dated Apr. 2, 2029.
Automated Structural Interpretation Through Classification of Seismic Horizons, Mathematical Methods and Modelling in Hydrocarbon Exploration and Production, vol. 7.
First Office Action and search report dated Aug. 15, 2022 for counterpart Chinese patent application No. 201910280939.0, along with machine English translation downloaded from EPO.
Luo yang, Chinese Doctoral Dissertations & Master's Theses Full-text Database(Master) Basic Sciences, Research on target feature recognition in 3d seismic images, No. 3.
Feng Qian et al., A two-step mechanism for automated 3D horizon picking, SEG Denver 2014 Annual Meeting.
Su Mingjun et al., Technologies of sedimentary information extraction and intelligent interpretation based on 3D seismic data, 2016 SEG International Exposition and 86th Annual Meeting.
Liu huaqing et al., Thin bed prediction from interbeded background: Revised seismic sedimentological method, Lithologic Reseviors, vol. 30 No. 2.
Tu xianjian, Research on Seismic Horizon Tracking Method Based on Signal Classification, Chinese Doctoral Dissertations & Master's Theses Full-text Database(Master) Basic Sciences.
Zhang Quan et al., The improvement of seismic DNA algorithm and its application in automatic horizon pickup, Geophysical Prospecting for Petroleum, vol. 56 No. 3.
SU zhoajie, et al., Study of Horizon Tracking Method in Three-Dimensinal Seismic Images Based on Multilevel Frame, Chinese Doctoral Dissertations & Master's Theses Full-text Database(Master) Basic Sciences.

* cited by examiner

SEISMIC FULL HORIZON TRACKING METHOD, COMPUTER DEVICE AND COMPUTER-READABLE STORAGE MEDIUM

CROSS REFERENCE TO RELATED APPLICATIONS

This application claims priority from Chinese Application Number 201910280939.0, entitled "Seismic Full Horizon Tracking Method and Apparatus", filed on Apr. 9, 2019, the subject matter of which is incorporated herein by reference.

TECHNICAL FIELD

The present disclosure relates to the field of geophysical prospecting, in particular to a seismic full horizon tracking method, a computer device and a computer-readable storage medium.

BACKGROUND

This section is intended to provide a background or context for embodiments of the disclosure set forth in the claims. Although included in this section, the description herein is not acknowledged to be the prior art.

Seismic horizon tracking is the basis of three-dimensional seismic interpretation, and the efficiency and accuracy of a horizon tracking method directly affect the effect of the subsequent seismic interpretation and reservoir prediction. The conventional artificial tracking method of the three-dimensional seismic horizon is to interpret a two-dimensional seismic profile item by item, and finally form a three-dimensional seismic horizon by using an interpolation to the horizon line based on the two-dimensional profile. Such an artificial tracking method has two shortcomings: one is that the idea of a seismic interpreter will be limited to a two-dimensional profile, rather than a horizon interpretation from a three-dimensional perspective. Because the geological structure exists in a three-dimensional space in a three-dimensional way, the artificial interpretation is seriously inadequate to reflect the overall geological structure. The other one is that the artificial horizon tracking is time-consuming and effort-consuming, and the tracking effect depends on seismic signal qualities, seismic-geological conditions and experience of the seismic interpreter.

In order to overcome the deficiencies in the artificial tracking method of the three-dimensional seismic horizon, there is disclosed in the prior art a horizon automatic tracking method based on seed points. In this method, the "seed points" are provided as a starting point and a control constraint point on line and trace profiles, and the horizon is automatically picked up according to the characteristics (amplitude, continuity) or similarity of the waveform. In essence, the automatic horizon tracking method based on seed points is a semi-automatic tracking method. This method is also time-consuming and effort-consuming, and does not make full use of three-dimensional seismic data to obtain full horizon tracking results. The seismic full horizon tracking method can liberate the seismic interpreter from the time-consuming and effort-consuming work of picking up horizons manually, and can make full use of the three-dimensional seismic data to obtain the global optimal horizon tracking results in three-dimensional space.

At present, the seismic full horizon tracking method proposed at home and abroad generally only takes into account the local information of seismic data, and performs well in areas with relatively simple geological structures. It cannot meet the requirements of seismic exploration in complex geological areas, for example, it has certain limitations in faults, and horizon tracking is prone to produce a layer crossing phenomenon under complex seismic-geological conditions.

SUMMARY

There is provided in an embodiment of the present disclosure a seismic full horizon tracking method, to solve the technical problem that a layer crossing phenomenon occurs when an existing seismic full horizon tracking method tracks horizons of a complex geological area. The method includes: acquiring three-dimensional seismic data; extracting horizon extreme points from the three-dimensional seismic data to construct a sample space; equally dividing the sample space into a plurality of sub-spaces with overlapping portions, and performing a clustering process on the horizon extreme points in each sub-space to obtain horizon fragments corresponding to each horizon of the three-dimensional seismic data; establishing a topological consistency between the horizon fragments; and fusing the horizon fragments corresponding to each horizon of the three-dimensional seismic data based on the topological consistency, to obtain a full horizon tracking result of the three-dimensional seismic data.

There is provided in an embodiment of the present disclosure a computer device, to solve the technical problem that a layer crossing phenomenon occurs when an existing seismic full horizon tracking method tracks horizons of a complex geological area. The computer device comprises a memory, a processor and a computer program that is stored in the memory and run on the processor. When executing the computer program, the processor implements the following methods of: acquiring three-dimensional seismic data; extracting horizon extreme points from the three-dimensional seismic data to construct a sample space; equally dividing the sample space into a plurality of sub-spaces with overlapping portions, and performing a clustering process on the horizon extreme points in each sub-space to obtain horizon fragments corresponding to each horizon of the three-dimensional seismic data; establishing a topological consistency between the horizon fragments; and fusing the horizon fragments corresponding to each horizon of the three-dimensional seismic data based on the topological consistency, to obtain a full horizon tracking result of the three-dimensional seismic data.

There is provided in an embodiment of the present disclosure a computer-readable storage medium, to solve the technical problem that a layer crossing phenomenon occurs when an existing seismic full horizon tracking method tracks horizons of a complex geological area. The computer-readable storage medium stores a computer program executing the following methods of: acquiring three-dimensional seismic data; extracting horizon extreme points from the three-dimensional seismic data to construct a sample space; equally dividing the sample space into a plurality of sub-spaces with overlapping portions, and performing a clustering process on the horizon extreme points in each sub-space to obtain horizon fragments corresponding to each horizon of the three-dimensional seismic data; establishing a topological consistency between the horizon fragments; and fusing the horizon fragments corresponding to each horizon of the three-dimensional seismic data based on the topological consistency, to obtain a full horizon tracking result of the three-dimensional seismic data.

In the embodiments of the disclosure, after the three-dimensional seismic data is acquired, horizon extreme points of all horizons are extracted from the three-dimensional seismic data, and the sample space is constructed based on the extracted horizon extreme points. When the horizon extreme points in the sample space are clustered, firstly the sample space is equally divided into a plurality of sub-spaces with overlapping portions, and then the sub-spaces are clustered to obtain horizon fragments corresponding to each horizon of three-dimensional seismic data. After the horizon fragments corresponding to each horizon of three-dimensional seismic data are obtained, a topological consistency between the horizon fragments is established, and the horizon fragments corresponding to each horizon are fused based on the topological consistency between the horizon fragments, to obtain a full horizon tracking result of the three-dimensional seismic data.

In the embodiments of the disclosure, after the sample space formed by the horizon extreme points is divided into a plurality of sub-spaces, the horizon extreme points in the sub-spaces are clustered, so that the influence of local connection between some different horizons in the three-dimensional seismic data can be removed, thereby avoiding a layer crossing phenomenon occurring in seismic full horizon tracking. Since a layer crossing phenomenon is avoided and horizon fragmentation occurs, in the embodiments of the disclosure, the horizon fragments can be fused by establishing a topological consistency, which improves the accuracy of fusion of the horizon fragments and has a better full horizon tracking effect.

BRIEF DESCRIPTION OF DRAWINGS

In order to more clearly explain the embodiments of the disclosure or the technical solution in the prior art, drawings that need to be used in the description in embodiments or the prior art will be simply introduced below, obviously the drawings in the following description are merely some examples of the disclosure, for persons ordinarily skilled in the art, it is also possible to obtain other drawings according to these drawings without making creative efforts. In the drawings.

DESCRIPTION OF EMBODIMENTS

In order to more clearly explain purpose, technical solution and advantages according to embodiments of the disclosure, hereinafter the embodiments of the disclosure will be further described in detail in combination with the drawings. Here in the text, the schematic embodiments of the disclosure and the description thereof are used for explaining the disclosure and do not constitute definition to the disclosure.

A three-dimensional seismic image is obtained by seismic exploration, reflecting the geological structure of an exploration area. Three-dimensional seismic exploration is to explore the geological situation under an area, and a seismic image formed by three-dimensional exploration has two directions on the earth's surface and a direction extending underground. The three-dimensional seismic image can be used to analyze geological and reservoir structures under the area. Horizon tracking is to find all the points belonging to the same horizon in the three-dimensional seismic image, and therefore, a horizon tracking process can be regarded as a classification of the horizon points.

Figure 1:
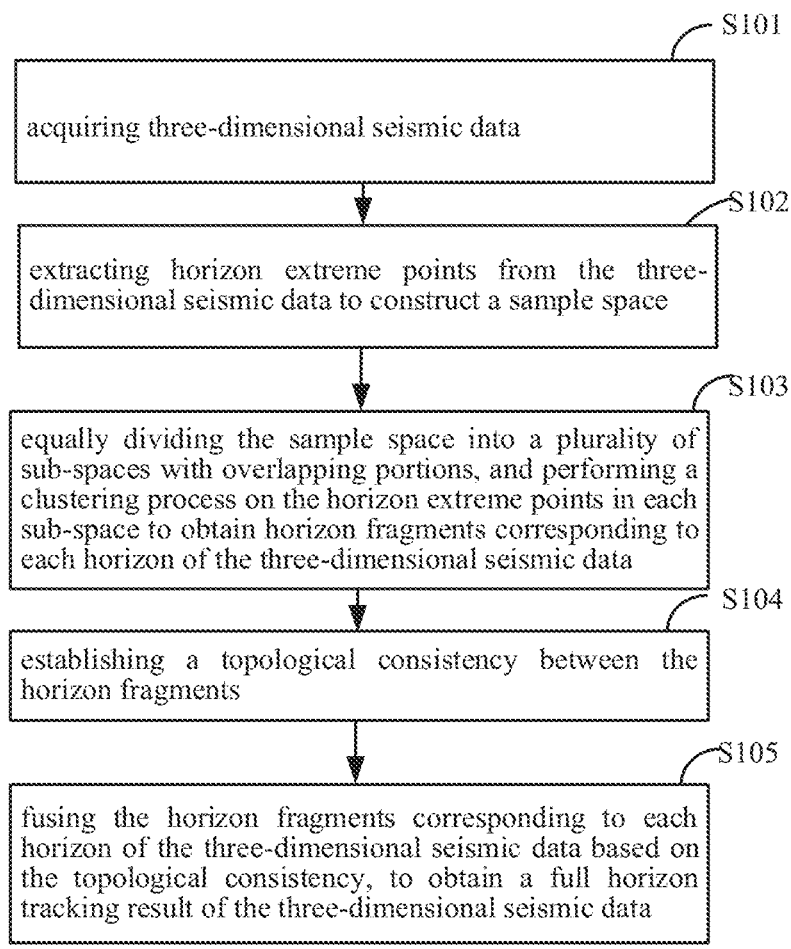
FIG. 1 is a flowchart of a seismic full horizon tracking method according to an embodiment of the present disclosure.

An embodiment of the present disclosure provides a seismic full horizon tracking method, which can be applied to, but not limited to, seismic exploration of a complex geological structure area. FIG. 1 is a flowchart of a seismic full horizon tracking method according to an embodiment of the present disclosure. As shown in FIG. 1, the method includes the following steps.

In S101, three-dimensional seismic data are acquired.

It should be noted that the data in the three-dimensional seismic image is three-dimensional amplitude data. Since the amplitude data may be affected by noise and the structural information in the amplitude data may be affected by noise, as an alternative embodiment, after the three-dimensional seismic data is acquired, the seismic full horizon tracking method provided in the embodiment of the present disclosure may further include: denoising the three-dimensional seismic data by using a structure-oriented filtering algorithm. The amplitude data is preprocessed by using the structure-oriented filtering algorithm. The filtered amplitude data can effectively reduce the noise while retaining the original structure information, making the structure information in the amplitude data more obvious. And then the position of each horizon is found in the amplitude data, and the position of the amplitude is accurately found out in the three-dimensional seismic image in combination with the waveform features of the seismic data, so as to prepare for subsequent horizon tracking.

It should be noted that there are many methods for signal denoising, such as low-pass filtering based on a frequency domain, median filtering based on a space domain and wavelet denoising and the like. The denoising of the three-dimensional seismic data by using these conventional denoising methods will smooth out some geological structure information and detailed information, but these structural information is of concern for horizon tracking. In the embodiments of the present disclosure, a structure-oriented filtering algorithm is used for denoising the three-dimensional seismic data. This algorithm is capable of reducing the noise while retaining structure information and edge information in the three-dimensional seismic data. In the structure-oriented filtering algorithm, values of each data point in the three-dimensional seismic data in an inline direction, in a crossline direction and in a time direction are regarded as position (x, y, z) of the data point in the three-dimensional space, and the magnitude of the amplitude is regarded as the data value of the data point, such that the three-dimensional seismic data can be regarded as a function of u (x, y, z). It should be noted that the inline direction and the crossline direction are two directions artificially specified by the seismic interpreter in order to facilitate data analysis and sorting, and play a role of an orthogonal coordinate system in the three-dimensional seismic data.

$$\frac{\partial u}{\partial x}, \frac{\partial u}{\partial y}, \frac{\partial u}{\partial z}$$

denote partial derivatives in directions x, y, z, respectively, and the structure tensor S is defined as:

$$S = \begin{bmatrix} \frac{\partial u}{\partial x}\frac{\partial u}{\partial x} & \frac{\partial u}{\partial x}\frac{\partial u}{\partial y} & \frac{\partial u}{\partial x}\frac{\partial u}{\partial z} \\ \frac{\partial u}{\partial x}\frac{\partial u}{\partial y} & \frac{\partial u}{\partial y}\frac{\partial u}{\partial y} & \frac{\partial u}{\partial y}\frac{\partial u}{\partial z} \\ \frac{\partial u}{\partial x}\frac{\partial u}{\partial z} & \frac{\partial u}{\partial y}\frac{\partial u}{\partial z} & \frac{\partial u}{\partial z}\frac{\partial u}{\partial z} \end{bmatrix} \quad (1)$$

In order to make the structure tensor robust, this structure tensor is convolved with a small-scale Gaussian kernel which can be expressed as follows:

$$S_\sigma = S(G_\sigma \times u(t)) \quad (2)$$

wherein, $G_\sigma$ denotes a small-scale Gaussian kernel; $S_\sigma$ denotes a positive semi-definite matrix, and eigenvalue decomposition is performed on $S_\sigma$ to obtain:

$$S_\sigma = (v_1 \; v_2 \; v_3) \begin{bmatrix} \lambda_1 & 0 & 0 \\ 0 & \lambda_2 & 0 \\ 0 & 0 & \lambda_3 \end{bmatrix} (v_1 \; v_2 \; v_3)^T \quad (3)$$

$\lambda_1$, $\lambda_2$ and $\lambda_3$ are eigenvalues of $S_\sigma$ in three directions, and $\lambda_1 \geq \lambda_2 \geq \lambda_3 \geq 0$; $v_1$, $v_2$ and $v_3$ denote corresponding eigenvectors. In order to protect the edge structure, the diffusion effect of the structure-oriented filtering algorithm is suppressed at the orientation parallel to the gradient at each position. In order to suppress the noise, and enhance and highlight the image signal in the diffusion direction, the diffusion process is developed at an orientation orthogonal to the gradient direction. The diffusion tensor D is constructed by the respective components $v_{21}$, $v_{22}$, $v_{31}$ and $v_{32}$ of the two eigenvectors $v_2$ and $v_3$ orthogonal to the gradient orientation:

$$D = \begin{bmatrix} v_{21}v_{21} + v_{31}v_{31} & v_{21}v_{22} + v_{31}v_{32} & v_{21}v_{23} + v_{31}v_{33} \\ v_{21}v_{22} + v_{31}v_{32} & v_{22}v_{22} + v_{32}v_{32} & v_{22}v_{23} + v_{32}v_{33} \\ v_{21}v_{23} + v_{31}v_{33} & v_{22}v_{23} + v_{32}v_{33} & v_{23}v_{23} + v_{33}v_{33} \end{bmatrix} \quad (4)$$

As such, the structure-oriented filtering equation is:

$$u(t+1) = u(t) + c \times \mathrm{div}(D(G_\sigma \times u(t))\nabla u) t \geq 0 \quad (5)$$

wherein, div(·) denotes a divergence function; t is used to adjust the iteration number of the diffusion equation, $c \in [0,1]$ denotes an iteration step, $G_\sigma$ denotes a Gaussian kernel function, $\nabla u$ denotes gradient. In order to highlight the edge structure and discontinuity information of the three-dimensional seismic data, a discontinuity factor is introduced into structure-oriented filtering, and the discontinuous factor is:

$$f = \frac{\mathrm{diag}(S^0 S)}{\mathrm{diag}(S^0)\mathrm{diag}(S)} \quad (6)$$

wherein, diag(·) denotes a principal diagonal element sum, $S^0$ denotes a structure tensor of raw data, S denotes a structure tensor during the current iteration process, the value of the discontinuity factor f that is in the vicinity of the edge structure and an intermittent structure tends to be 0, and the value of the discontinuity factor f that is far away from the edge structure tends to be 1, and the iterative formula of the structure-oriented filtering algorithm after introduction of the discontinuity factor is:

$$u(t+1) = u(t) + c \times \mathrm{div}(f \times D(G_\sigma \times u(t))\nabla u) t \geq 0 \quad (7)$$

Figure 2:
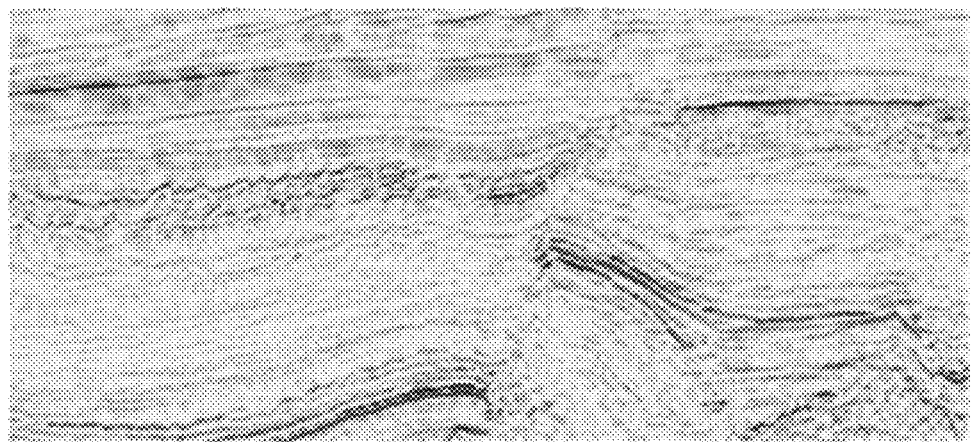
FIG. 2 is a schematic diagram before a structure-oriented filtering processing algorithm is used to denoise seismic data in a research work area according to an embodiment of the present disclosure.
Figure 3:
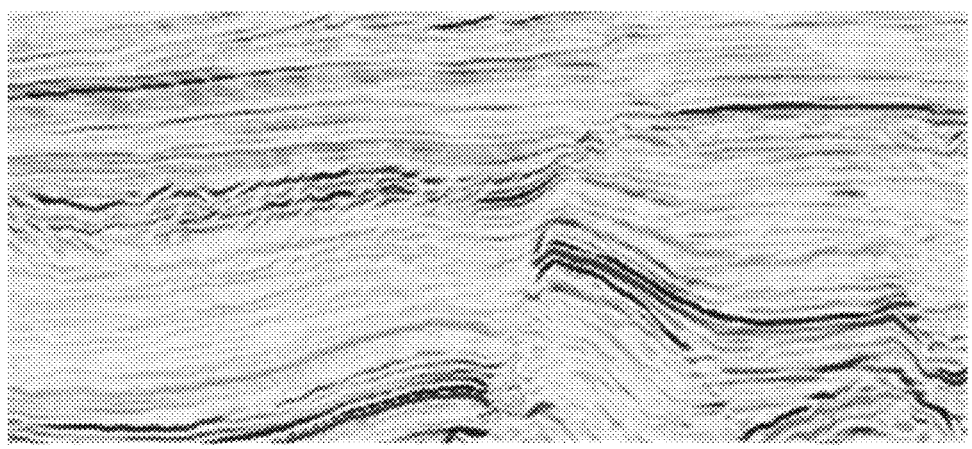
FIG. 3 is a schematic diagram after a structure-oriented filtering processing algorithm is used to denoise seismic data in a research work area according to an embodiment of the present disclosure.

For example, FIG. 2 and FIG. 3 are schematic diagrams before and after a structure-oriented filtering processing algorithm is used to denoise seismic data in a research work area, respectively. It can be seen from the comparison diagrams before and after the filtering that the structure-oriented filtering can effectively remove the noise in the seismic data, and the original edge structure information and detailed information of seismic data are retained while the noise is removed.

In S102, horizon extreme points are extracted from the three-dimensional seismic data to construct a sample space.

It should be noted that the three-dimensional seismic data is a distribution of the seismic waveform in the inline direction profile and the crossline direction profile, and the seismic waves are reflected strongly in places where the petrophysical characteristics of the bottom layer change significantly, and the reflected waves returned back to the ground has a high intensity which is shown as greater waveform amplitudes in the three-dimensional seismic image. In the places where the petrophysical characteristics of the bottom layer do not change obviously, the seismic waves are reflected smaller, so that the reflected waves returned back to the ground has a low intensity which is shown as smaller waveform amplitudes in the three-dimensional seismic image. Due to the obvious change of wave impedance between different layers, a strong reflected wave may be produced when seismic wave propagates to the boundary of two layers, which is shown as greater waveform amplitudes in the three-dimensional seismic image, and therefore, it is generally considered that the horizon is located at the maximum value in the three-dimensional seismic image.

The horizon extreme point is an intersection point of the horizon and each trace of seismic data, and is also the position of the horizon in each trace of data. The continuity of the horizon in the three-dimensional space is not absolute, and the continuity of the horizon may be affected by complex geological structure such as faults. In the three-dimensional seismic image, a plurality of horizon extreme points are connected together to form a continuous horizon fragment, and the complete horizon can be regarded as a concatenation of some continuous horizon fragments in the space.

As an alternative embodiment, the above step S102 may specifically include the following step: determining a seismic waveform corresponding to each seismic trace according to the three-dimensional seismic data; finding a maximum point of an amplitude of the waveform of each seismic trace, wherein each maximum point of an amplitude corresponds to one horizon extreme point; and constructing a sample space according to the found maximum point of an amplitude.

Figure 4:
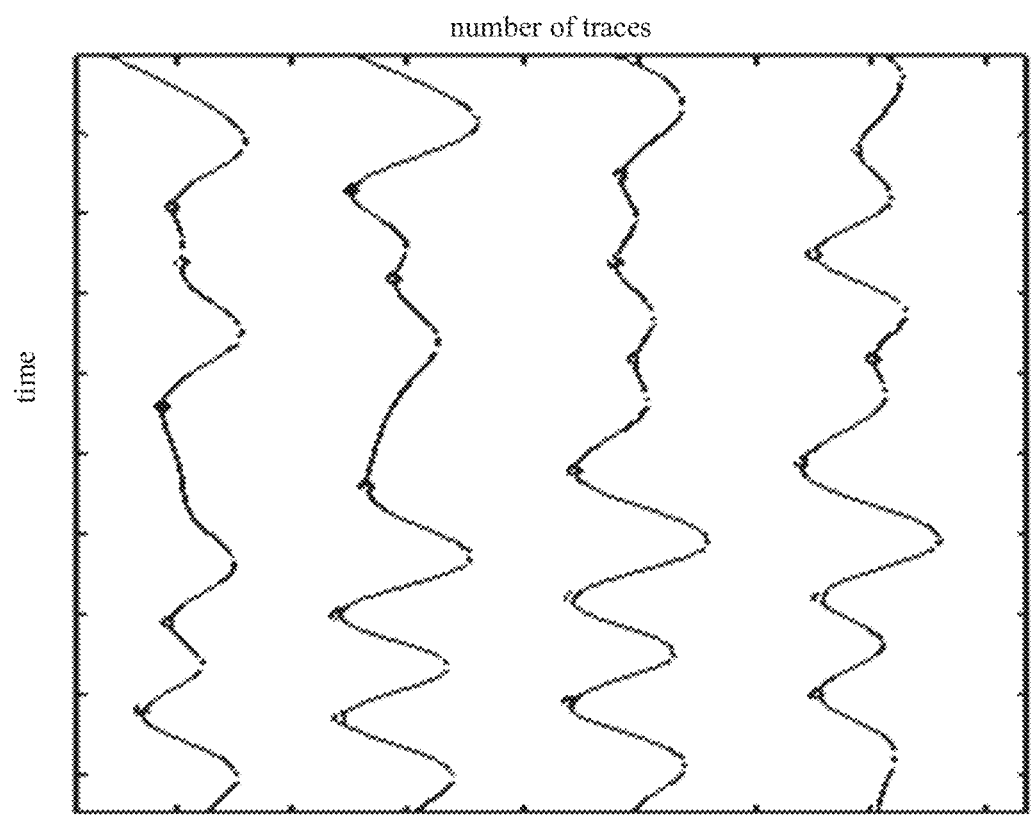
FIG. 4 is a schematic diagram of seismic trace waveforms of three-dimensional seismic data according to an embodiment of the present disclosure.

It should be noted that, the three-dimensional seismic data volume is regarded as a function of u(x, y, z), when the serial numbers of inline and crossline are fixed, one trace of data $u(x_0, y_0, z)$ can be determined. A trace of seismic data is represented as a seismic waveform, and the maximum value of the seismic waveform is the position of the horizon extreme point. FIG. 4 shows several waveform data extracted from the three-dimensional seismic data. The positions of the horizon extreme points are determined by finding the positions of the maximum and the minimum of the waveform. All extreme points of the three-dimensional seismic data volume are obtained by processing each trace of data in the three-dimensional data volume. The value of the ith point on the seismic waveform is defined as $k_i$, if the ith point is the maximum point, then the ith point satisfies the condition $k_{i-1} < k_i, k_{i+1} < k_i$. With such a relation, all the horizon extreme points in the data volume can be conveniently obtained.

As can be seen from FIG. 4, since the horizons are in a layered distribution in the three-dimensional space, the horizon extreme points corresponding to these horizons are also in a layered distribution in the three-dimensional space substantially. The extreme points belonging to one horizon are adjacent to each other in the horizontal direction, and the extreme points belonging to different horizons have certain gaps in the vertical direction. That is, all the horizon extreme points in the three-dimensional seismic data are substantially distributed continuously in the horizontal direction and are in a layered distribution in the vertical direction.

Figure 5:
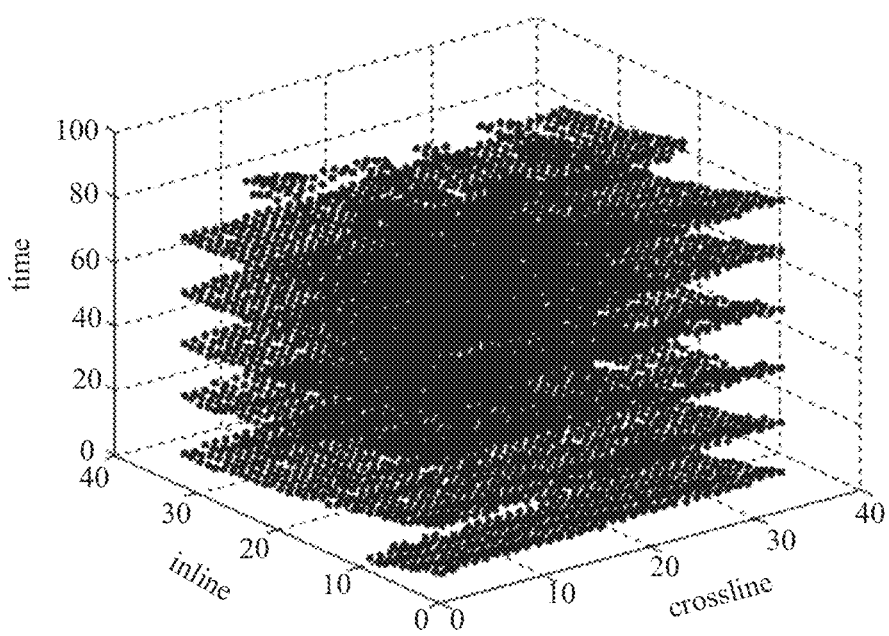
FIG. 5 is a schematic diagram of a distribution of horizon extreme points in a three-dimensional space according to an embodiment of the present disclosure.

FIG. 5 is a schematic diagram of a distribution of horizon extreme points in a three-dimensional space according to an embodiment of the present disclosure. As shown in FIG. 5, the distribution of the horizon extreme points in three-dimensional data volume in the three-dimensional space has such properties as: a certain continuity in the horizontal direction, a layered distribution in the vertical direction, and with certain gaps between the horizon extreme points of different horizons.

In S103, the sample space are equally divided into a plurality of sub-spaces with overlapping portions, and a clustering process is performed on the horizon extreme points in each sub-space to obtain horizon fragments corresponding to each horizon of three-dimensional seismic data.

It should be noted that after processing the three-dimensional seismic data to extract the horizon extreme points of all horizons and constructing the sample space, the embodiment of the present disclosure adopts an improved density-based clustering algorithm (DBSCAN, Density-Based Spatial Clustering of Applications with Noise), that is, the clustering process is performed on the sample space by using a DBSCAN algorithm based on patch-wise. Differently from the conventional DBSCAN clustering method, the DBSCAN clustering method based on patch-wise divides the data space into small sub-spaces that have equal size and overlapping portions between each other. The DBSCAN algorithm is applied in each small sub-space to obtain numerous patches. If the number of the same extreme points tracked between adjacent patches exceeds a threshold value, then two small fragments are fused.

It should be noted that the DBSCAN clustering algorithm divides dense data into clusters by utilizing an area with sparse data in the data space. The definition of denseness in the data space is the number of data objects within a certain field. Since the density of points belonging to the same horizon in the three-dimensional space of seismic data is greater than the density of points belonging to different horizons, the horizon points in great density in the space can be aggregated based on the DBSCAN algorithm, to obtain a horizon section with good continuity.

Thus, as an alternative embodiment, the above step S103 may specifically include: equally dividing the sample space into a plurality of sub-spaces with overlapping portions; performing a clustering process on the horizon extreme points in each sub-space based on the DBSCAN clustering algorithm, to trace out the horizon extreme points corresponding to each horizon in each sub-space; judging whether the number of the horizon extreme points shared by the overlapping portions of two adjacent sub-spaces exceeds a preset threshold value; fusing the two adjacent sub-spaces having the number of horizon extreme points shared by the overlapping portions that exceeds the preset threshold value, to obtain horizon fragments corresponding to each horizon of three-dimensional seismic data.

Figure 6:
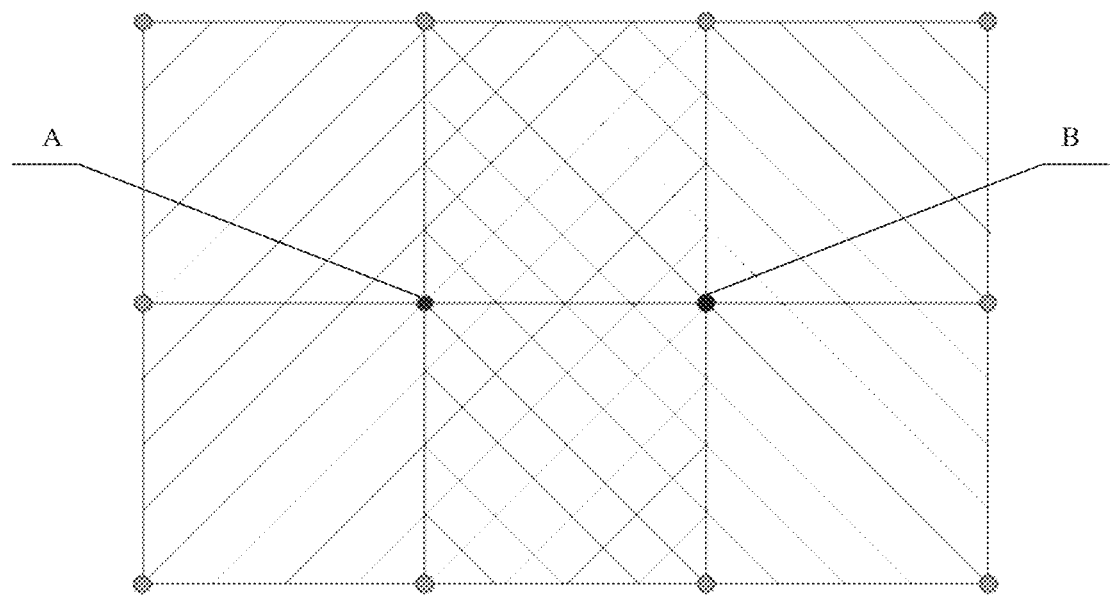
FIG. 6 is a schematic diagram of a DBSCAN clustering principle based on patch-wise according to an embodiment of the present disclosure.

FIG. 6 is a schematic diagram of a DBSCAN clustering principle based on patch-wise according to an embodiment of the present disclosure. As shown in FIG. 6, the DBSCAN clustering algorithm based on patch-wise includes the following two steps.

Figure 7:
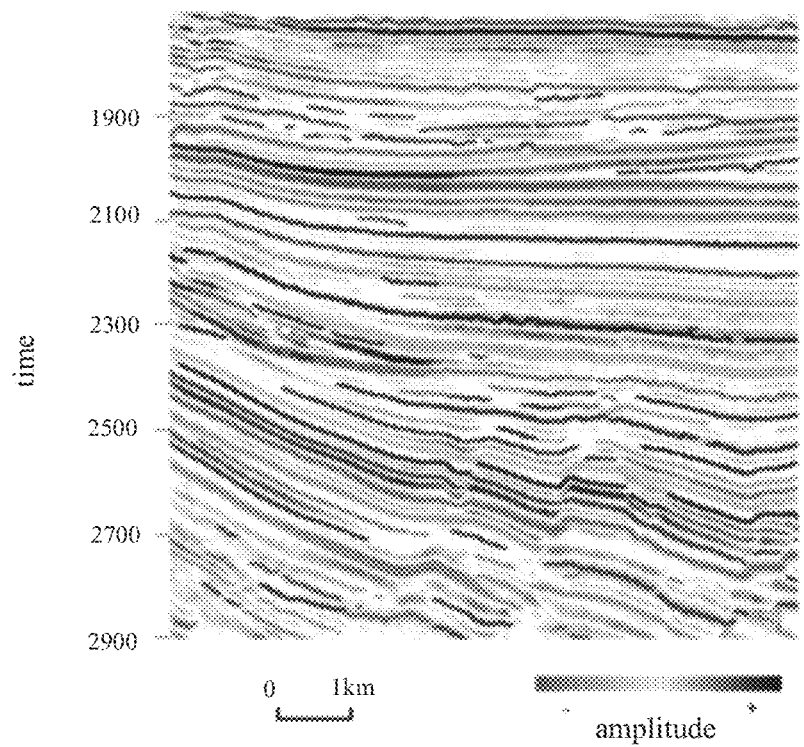
FIG. 7 is a schematic diagram of an effect of horizon tracking using a conventional DBSCAN clustering algorithm according to an embodiment of the present disclosure.

The first step is to divide the sample space in an inline-crossline plane into grids according to a predetermined grid size (the grid size is determined according to a general size of the layer crossing portion in the three-dimensional seismic data), to obtain grid points (seed points), such as seed points A and B in FIG. 7. Taking the seed point A as an example, DBSCAN clustering is performed on the surrounding area (a left diagonal area) to obtain a block area, and so on for other seed points. In FIG. 7, a right diagonal area is a block area obtained by performing the DBSCAN clustering on the seed point B.

Figure 8:
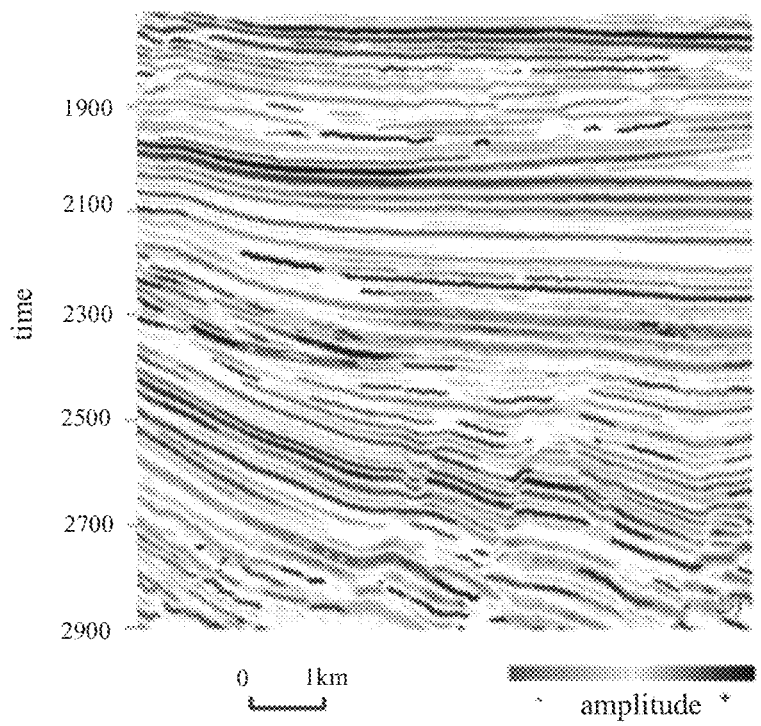
FIG. 8 is a schematic diagram of an effect of horizon tracking using a DBSCAN clustering algorithm based on patch-wise according to an embodiment of the present disclosure.

The second step is to judge whether the overlapping portions of the block areas respectively traced by the seed point A and the seed point B can be fused. If the overlapping portions of the two block areas (the number of the common extreme points) are greater than a preset threshold value (the minimum number of common points), the two block areas can be fused. FIG. 7 is a schematic diagram of an effect of horizon tracking using a conventional DBSCAN clustering algorithm according to an embodiment of the present disclosure. FIG. 8 is a schematic diagram of an effect of horizon tracking using a DBSCAN clustering algorithm based on patch-wise according to an embodiment of the present disclosure. As shown in FIGS. 7 and 8, compared with the conventional DBSCAN clustering method, a complete horizon is processed into many small horizon fragments.

In S104, a topological consistency is established between the horizon fragments.

Because the geological structure shows a layered distribution and the single layer has similar wave impedances in local areas, thus the single layer has same reflected waves in local areas, reflecting in the three-dimensional seismic image that the waveform characteristics in the same horizon has a spatial lateral continuity.

It should be noted that, in the embodiments of the present disclosure, a horizon curved surface can be reduced to lines with similar topology by applying a medial axis transform or morphological refinement, and then the large horizon curved surface is decomposed into small topologically consistent fragments. Since the refinement is applied to a four-connected sense, each intersection point between the line segments has at least three directly adjacent points. The morphological refinement is applied again to remove these intersections, thereby reducing these original curved surfaces to some unconnected, characterized points, which are easily labeled with some unique identifiers or labels. These specified labels are subsequently propagated back to the original curved surface, and this process is popularized as back-propagation or simply as propagation.

As an alternative embodiment, the above step S104 may specifically include: refining the horizon fragments on each horizon curved surface into line segments, wherein one horizon curved surface is a curved surface on which all horizon extreme points on one horizon are located; removing intersection points between the line segments on each horizon curved surface; refining the line segments on each horizon curved surface on which the intersection points are removed, into feature points; adding different labels to different feature points on each horizon curved surface; back-propagating the labels of the feature points on each horizon curved surface to the corresponding horizon curved surface to obtain horizon fragments with different labels; adjusting the horizon fragments with different labels on each horizon curved surface to be topologically consistent.

Alternatively, adjusting the horizon fragments with different labels on each horizon curved surface to be topologically consistent may specifically include the following steps: establishing an overlap table, wherein the overlap table is used to record an overlap between the horizon fragments with different labels on each horizon curved surface; recognizing horizon fragments with inconsistent topologies in the overlap table; deleting the horizon fragments with inconsistent topologies in the overlap table; and topologically sorting the remaining horizon fragments in the overlap table.

It should be noted that the topological inconsistency of the horizon fragments may include a local inconsistency or a global inconsistency, whereby, as an alternative embodiment, recognizing horizon fragments with inconsistent topologies in the overlap table may include, but is not limited to, the following two cases: recognizing the horizon fragments as having a local inconsistency if there is a self-overlapping relationship between the horizon fragments with different labels on the curved surface of the same horizon or there is an overlapping relationship between the horizon fragments with different labels on the curved surfaces of upper and lower horizons; and recognizing the horizon fragments as having a global inconsistency if there is a cyclic overlapping relationship between the horizon fragments with different labels on the curved surfaces of multiple horizons.

Figure 9:
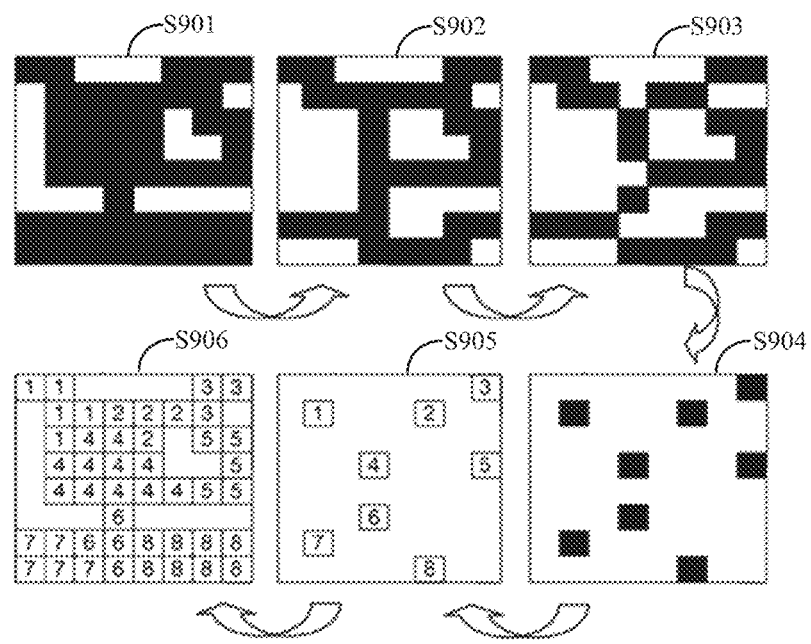
FIG. 9 is a schematic diagram illustrating a principle of refining a curved surface into labeled feature points according to an embodiment of the present disclosure.

FIG. 9 shows a process of refining a complete curved surface into labeled feature points, including: forming a line from a multi-valued curved surface (S901) by using the morphological refinement (S902), removing the line segment nodes (S903), refining the line into points by applying the morphological refinement again (S904), labeling the points (S905), and finally backing-propagating the labels of the points to the curved surfaces (S906).

The points with the same labels form one fragment. The result in FIG. 9 is a group of eight fragments in S906, corresponding to eight feature points in S905. With a corresponding construction, the size of these fragments will be smaller than or equal to the size of their parent curved surface, because each feature point may compete with an adjacent feature point to obtain more points. To improve efficiency, the back propagation may be implemented in advance, for example, using a simple wildfire algorithm or a controlled matching algorithm, while using waveform similarity, vertical proximity, and a local curvature of the curved surface as limiting conditions. The advantage of the controlled matching algorithm over the wildfire algorithm is that it can propagate the label quickly in a flat area and relatively slowly in a complex area, thereby producing a series of more uniform fragments.

It should be further noted here that although the fragments that are obtained after the back propagation of the labels is completed, are approximately continuous, but they are not guaranteed to be topologically consistent. In order to better perform the topology fusion, it is best to adjust these fragments to be topologically consistent. The preferred method to discover topological inconsistency is to establish an overlap table that is used to record the overlap between the fragments: which fragments overlap and in what way. Through the establishment of the overlap table and the subsequent verification, the curved surfaces with a self-overlapping relationship or a conflicted upper and lower overlapping relationship (local inconsistency) may be recognized very easily. Finally, by attempting to topologically sort the remaining fragment items in the overlap table, many sets of three or more fragments that have a cyclic upper and lower overlapping relationship (global inconsistency) may be found. If no cyclic overlap occurs, then topological sorting is successful; if there is a global inconsistency, then the topological sorting is unreasonable, and a list of fragments with an inconsistent relationship will be returned.

Finally, the recognized fragments having the topological inconsistency are edited and corrected. There are three correction methods: the first method is to delete the inconsistent fragments; the second method is to remove only the root fragments that cause overlapping conflicts; and the third method is to repeatedly decompose those inconsistent fragments into smaller fragments until all inconsistencies are resolved. The second method may require multiple recalculations because some fragments may be disconnected due to the delete operation and it may be necessary to re-label the fragments that need to be obtained. Practice has shown that simple deletion of inconsistent fragments seems to achieve a better effect because usually there are much more consistent fragments than inconsistent fragments, and those inconsistent fragments are usually smaller and in the edge areas. After the inconsistent fragments are corrected, it is best to reconstruct the overlap table to measure these changes.

In S105, the horizon fragments corresponding to each horizon of the three-dimensional seismic data are fused based on the topological consistency, to obtain a full horizon tracking result corresponding to the three-dimensional seismic data.

On the basis of maintaining the topological consistency of adjacent curved surfaces, the adjacent small fragments are fused into large fragments. The first task is to confirm which fragments are connected to each other (that is, they are adjacent to each other in some way within the data volume, but are labeled differently). These fragments are referred to as adjacent fragments, and are recorded in an adjacency table as a candidate set for further fusion into large fragments, which are eventually fused to form a complete curved surface. For example, different fragments are separated out by refinement and reduced to a series of points with different features. If the curved surface is a regular rectangle and there are consistent connections in all directions of the rectangle, then the refinement process may produce five feature points, forming five fragments after the back propagation. It is worth noting that different fragments do not mean that they cannot be connected consistently. Most of the fragments that are fused together are previously part of a well-connected curved surface, and there are a lot of adjacent fragments around them. The order in which the candidate sets for the fusion of fragments are arranged will directly affect the number, shape and quality of the resulted topologically consistent curved surfaces. Taking two overlapping fragments as an example, if there is a third fragment that is adjacent to the two overlapping fragments, it cannot be fused with the two overlapping fragments because this may cause the fused fragments to self-overlap, in which case the third fragment can be only fused with one of the two overlapping fragments. This particular choice will affect the effect of subsequent fusion.

In this case, the adjacent pair of fragments in the adjacency table will be preferentially placed into the sequence of fusion. A fusion sequence is usually established by considering a correlation coefficient between adjacent fragments and the propagation direction of the waveform in which the fragments are located. The specific order of choice is as follows: adjacent fragments that are consistent will be fused first because they are most likely to belong to the same horizon; on the contrary, fragments that are inconsistent will be fused at last because they may be associated with noise artifacts or non-layer events, such as the fault being in contact with the fluid. There is also a more advanced way of sorting, which is judged based on statistical similarity between secondary seismic attributes extracted at adjacent locations of the fragments.

As a first alternative embodiment, the above step S105 may specifically include the following steps: acquiring an adjacency table, wherein the adjacency table contains horizon fragments connected to each other but having different labels; determining a fusion order of the horizon fragments based on the adjacency table; and fusing the horizon fragments corresponding to each horizon of the three-dimensional seismic data based on the fusion order.

Once the fusion order of the fragments has been determined in some way, the work of topology fusion can be started. Fusing the horizon fragments corresponding to each horizon of the three-dimensional seismic data based on the fusion order may include the following steps: acquiring second horizon fragments to be fused with first horizon fragments, wherein the second horizon fragments are horizon fragments adjacent to the first horizon fragments; judging whether there is a self-overlapping relationship between the second horizon fragments; verifying a global consistency of the second horizon fragments if the verification of the local consistency is passed; fusing the first horizon fragments and the second horizon fragments into one horizon if the verification of the global consistency is passed; and repeating the above steps until all the horizon fragments are fused.

Figure 10:
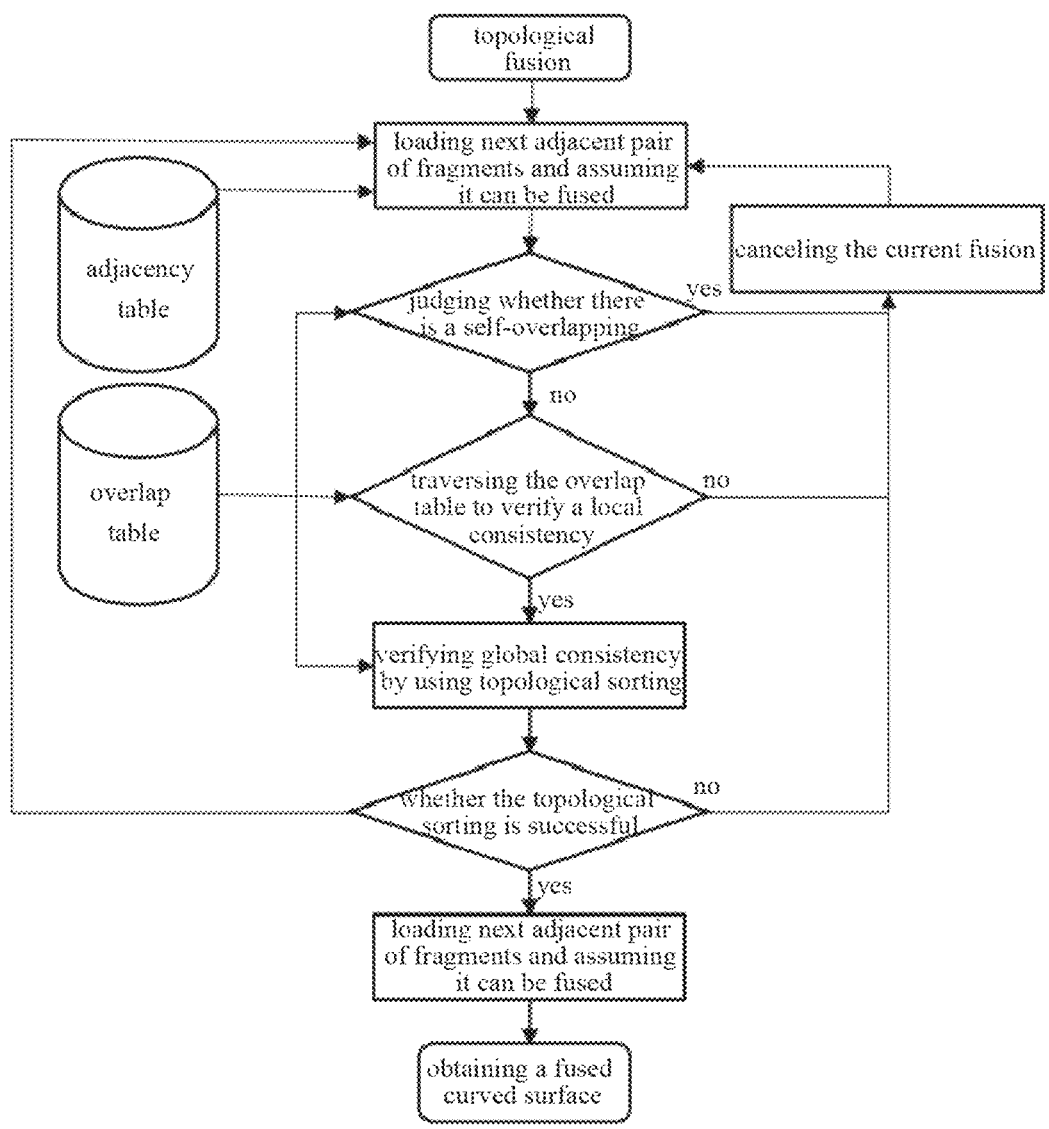
FIG. 10 is a schematic diagram of fusing horizon fragments on curved surfaces of each layer based on a topological consistency according to an embodiment of the present disclosure.

FIG. 10 is a schematic diagram illustrating that horizon fragments on curved surfaces of the layers are fused based on topological consistency according to an embodiment of the present disclosure. As shown in FIG. 10, firstly, a pair of adjacent fragments are selected as a fragment to be fused and a candidate fusion fragment, and it is assumed that the pair of fragments are a part of a curved surface (that is, the overlapping relationship of one fragment is applicable to another fragment, and vice versa). If topology inconsistency is caused by the process shown in FIG. 10, fusion will not be performed. If the fusing is to proceed, the orders of the overlap table and the adjacency table need to be adjusted by replacing the label of one fragment with the label of another fragment. The computational complexity of evaluating three consistency conditions after the assumed fusion is quite different, where the self-overlapping can be easily verified. The verification of local consistency requires a traversal check of the whole overlap table. The verification of global consistency requires the use of topological sorting, which has the highest computational complexity. As shown in FIG. 8, the three consistency verifications are cascaded in an order of the computational complexity. Only when the candidate fusion fragment passes the verification with a low computational complexity, it can enter the verification with a high computational complexity in the next step. Secondly, if the pair of adjacent fragments passes the topological sorting, then the pair of adjacent fragments to be fused has a global consistency, and thus is topologically consistent, the assumption holds, the overlap table and the adjacency table will be modified accordingly, and then the subsequent fragment pairs will be subjected to the above-mentioned processing in order. If the topological sorting or any other verification fails, then the fusion assumption does not hold and the above operation will continue to be performed on the next fragment pair.

Figure 11:
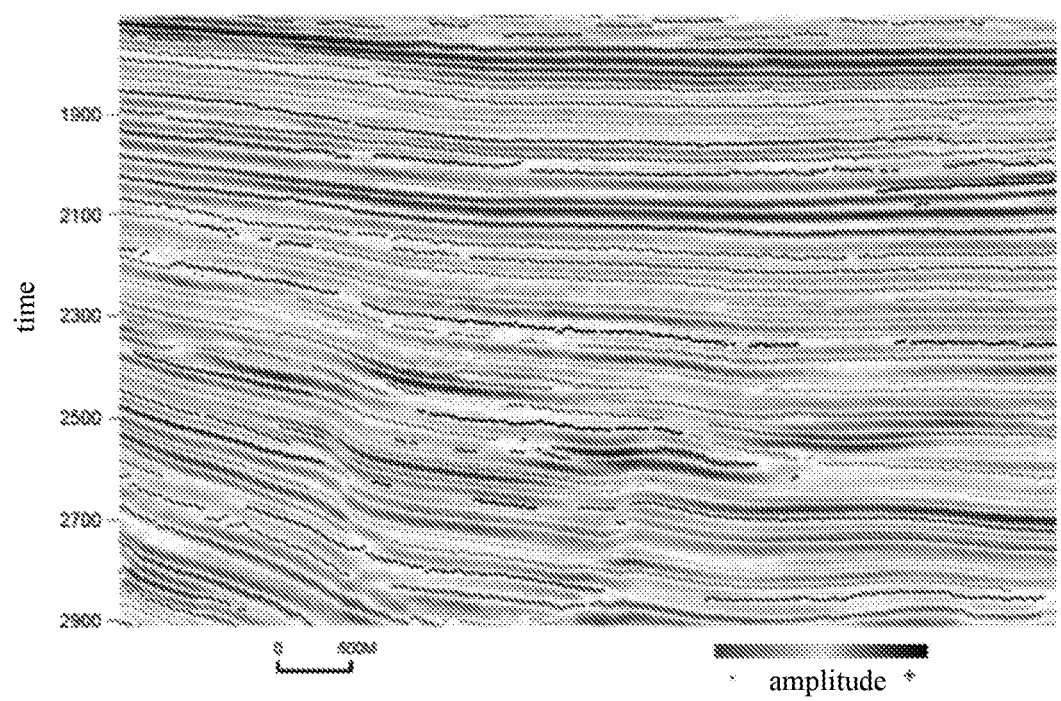
FIG. 11 is a sectional view of a result of seismic full horizon tracking of a research work area according to an embodiment of the present disclosure.
Figure 12:
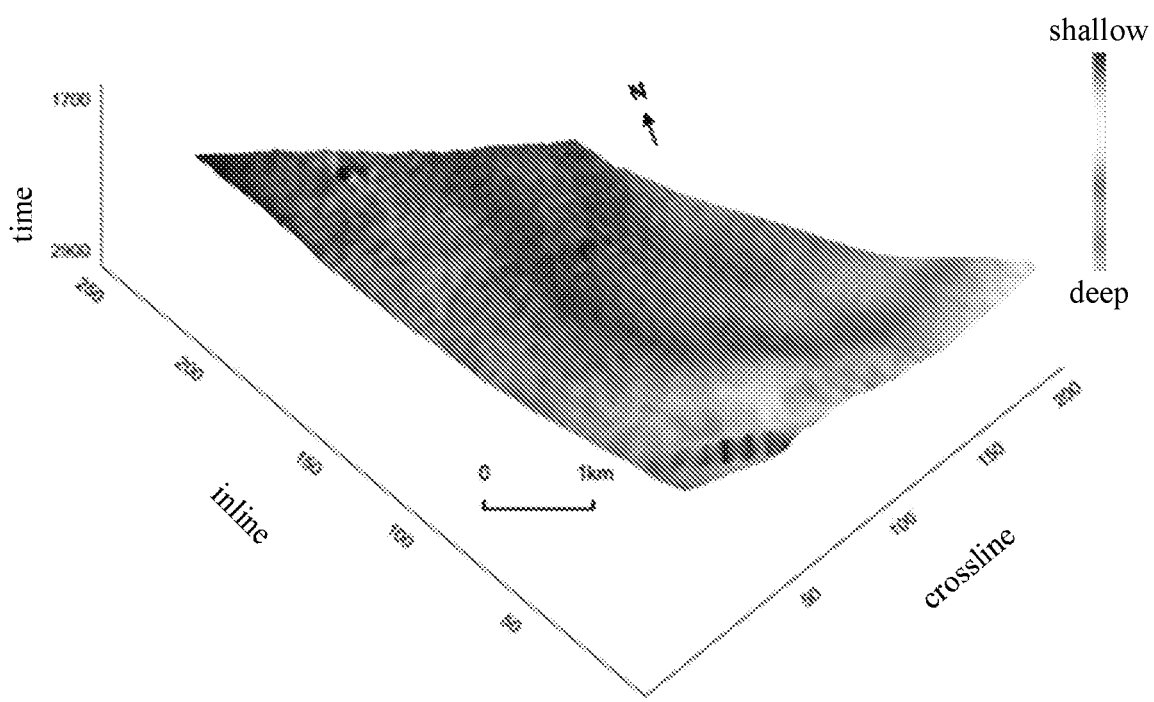
FIG. 12 is a three-dimensional stereogram of a certain horizon after seismic full horizon tracking is performed on a research work area according to an embodiment of the present disclosure.
Figure 13:
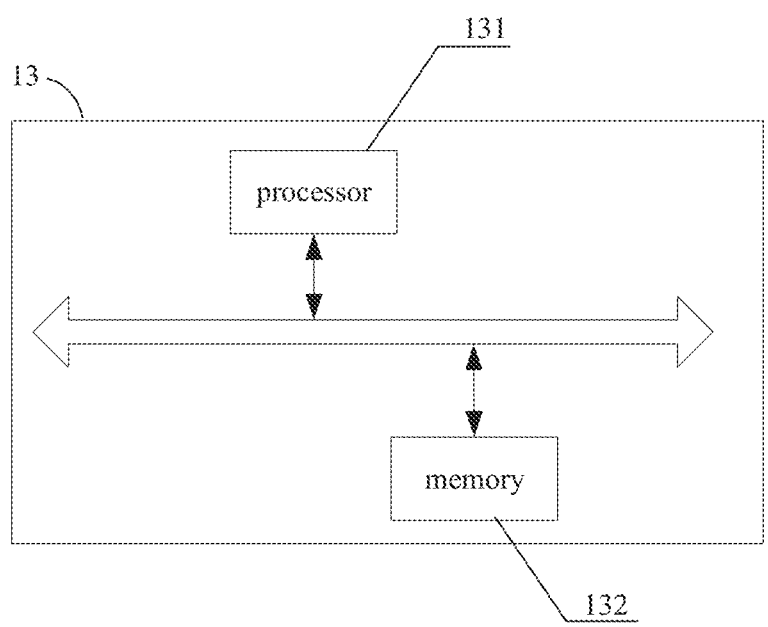
FIG. 13 is a schematic diagram of the structure of a computer device according to an embodiment of the present disclosure.

Taking the post-stack seismic data of a three-dimensional seismic work area as the test data, the test shows that the present disclosure can effectively avoid a layer crossing phenomenon, and obtain a high-quality full horizon automatic tracking result with seismic data of the complex work area. FIG. 11 is a cross-sectional view of a result of seismic full horizon tracking of a research work area according to an embodiment of the present disclosure, and it can be seen from FIG. 11 that there is no layer crossing phenomenon between horizons tracked by the seismic full horizon tracking method according to an embodiment of the present disclosure. FIG. 12 is a three-dimensional stereogram of a certain horizon after seismic full horizon tracking is performed on a research work area according to an embodiment of the present disclosure, and it can be seen from FIG. 12, the horizon tracked by the seismic full horizon tracking method provided in the embodiment of the present disclosure is relatively smooth and continuous.

In the embodiments of the present disclosure, a machine learning and a graph theory method are applied to realize the automatic tracking of the three-dimensional seismic full horizon, which has the following advantages: (1) at the level of the extreme points, the influence of local connectivity between different horizons in the three-dimensional data can be removed by using the DBSCAN machine learning algorithm based on patch-wise, to avoid the layer crossing phenomenon caused by the local connectivity between the horizons; (2) at the level of the horizon fragments, the topological consistency between the fragments can be established by using the graph theory to fuse the horizon fragments, to improve the accuracy of fragment fusion and achieve a better horizon tracking effect.

Based on the same inventive concept, there is provided in an embodiment of the present disclosure a computer device, to solve the technical problem that a layer crossing phenomenon occurs when an existing seismic full horizon tracking method tracks horizons of a complex geological area. The computer device 13 includes a memory 131, a processor 132 and a computer program that is stored in the memory 131 and run on the processor 132. When executing the computer program, the processor implements the following methods of: acquiring three-dimensional seismic data; extracting horizon extreme points from the three-dimensional seismic data to construct a sample space; equally dividing the sample space into a plurality of sub-spaces with overlapping portions, and performing a clustering process on the horizon extreme points in each sub-space to obtain horizon fragments corresponding to each horizon of the three-dimensional seismic data; establishing a topological consistency between the horizon fragments; and fusing the horizon fragments corresponding to each horizon of the three-dimensional seismic data based on the topological consistency, to obtain a full horizon tracking result of the three-dimensional seismic data.

In an alternative implementation, in the computer device provided in the embodiments of the present disclosure, when executing the computer program, the processor is further used to implement the following method of: denoising the three-dimensional seismic data by using a structure-oriented filtering algorithm.

In an alternative implementation, in the computer device provided in the embodiments of the present disclosure, when executing the computer program, the processor is further used to implement the following methods of: determining a seismic waveform corresponding to each seismic trace according to the three-dimensional seismic data; finding a maximum point of an amplitude of the waveform of each seismic trace, wherein each maximum point of the amplitude corresponds to one horizon extreme point; and constructing a sample space according to the maximum point of the amplitude that is found out.

In an alternative implementation, in the computer device provided in the embodiments of the present disclosure, when executing the computer program, the processor is further used to implement the following methods of: equally dividing the sample space into a plurality of sub-spaces with overlapping portions; performing a clustering process on the horizon extreme points in each sub-space based on a DBSCAN clustering algorithm, to trace out the horizon extreme points corresponding to each horizon in each sub-space; judging whether the number of the horizon extreme points shared by the overlapping portions of two adjacent sub-spaces exceeds a preset threshold value; and fusing the two adjacent sub-spaces having the number of horizon extreme points shared by the overlapping portions exceeds the preset threshold value, to obtain the horizon fragments corresponding to each horizon of three-dimensional seismic data.

In an alternative implementation, in the computer device provided in the embodiments of the present disclosure, when executing the computer program, the processor is further used to implement the following methods of: refining the horizon fragments on each horizon curved surface into line segments, wherein one horizon curved surface is a curved surface on which all horizon extreme points of one horizon are located; removing intersection points between the line segments on each horizon curved surface; refining the line segments on each horizon curved surface on which the intersection points are removed, into feature points; adding different labels to different feature points on each horizon curved surface; back-propagating the labels of the feature points on each horizon curved surface to the corresponding horizon curved surface, to obtain horizon fragments with different labels; and adjusting the horizon fragments with different labels on each horizon curved surface to be topologically consistent.

In an alternative implementation, in the computer device provided in the embodiments of the present disclosure, when executing the computer program, the processor is further used to implement the following methods of: establishing an overlap table, wherein the overlap table is used to record an overlap between the horizon fragments with different labels on each horizon curved surface; recognizing horizon fragments with inconsistent topologies in the overlap table; deleting the horizon fragments with inconsistent topologies in the overlap table; and topologically sorting the remaining horizon fragments in the overlap table.

In an alternative implementation, in the computer device provided in the embodiments of the present disclosure, when executing the computer program, the processor is further used to implement the following methods of: recognizing the horizon fragments as having a local inconsistency if there is a self-overlapping relationship between the horizon fragments with different labels on the curved surface of the same horizon or there is an overlapping relationship between the horizon fragments with different labels on the curved surfaces of upper and lower horizons; and recognizing the horizon fragments as having a global inconsistency if there is a cyclic overlapping relationship between the horizon fragments with different labels on the curved surfaces of multiple horizons.

In an alternative implementation, in the computer device provided in the embodiments of the present disclosure, when executing the computer program, the processor is further used to implement the following methods of: acquiring an adjacency table, wherein the adjacency table contains horizon fragments connected to each other but having different labels; determining a fusion order of the horizon fragments based on the adjacency table; and fusing the horizon fragments corresponding to each horizon of the three-dimensional seismic data based on the fusion order.

In an alternative implementation, in the computer device provided in the embodiments of the present disclosure, when executing the computer program, the processor is further used to implement the following methods of: acquiring second horizon fragments to be fused with first horizon fragments, wherein the second horizon fragments are horizon fragments adjacent to the first horizon fragments; judging whether there is a self-overlapping relationship between the second horizon fragments; traversing the overlap table to verify a local consistency of the second horizon fragments if there is no self-overlapping relationship between the second horizon fragments; verifying a global consistency of the second horizon fragments if the verification of the local consistency is passed; fusing the first horizon fragments and the second horizon fragments into one horizon if the verification of the global consistency is passed; and repeating the above steps until all the horizon fragments are fused.

Based on the same inventive concept, an embodiment of the present disclosure provides a computer-readable storage medium, to solve the technical problem that a layer crossing phenomenon occurs when an existing seismic full horizon tracking method tracks horizons of a complex geological area. The computer-readable storage medium stores a computer program executing the following methods of: acquiring three-dimensional seismic data; extracting horizon extreme points from the three-dimensional seismic data to construct a sample space; equally dividing the sample space into a plurality of sub-spaces with overlapping portions, and performing a clustering process on the horizon extreme points in each sub-space to obtain horizon fragments corresponding to each horizon of the three-dimensional seismic data; establishing a topological consistency between the horizon fragments; and fusing the horizon fragments corresponding to each horizon of the three-dimensional seismic data based on the topological consistency, to obtain a full horizon tracking result of the three-dimensional seismic data.

In an alternative implementation, the computer-readable storage medium provided in the embodiments of the present disclosure stores a computer program executing the following methods of: denoising the three-dimensional seismic data by using a structure-oriented filtering algorithm.

In an alternative implementation, the computer-readable storage medium provided in the embodiments of the present disclosure stores a computer program executing the following methods of: determining a seismic waveform corresponding to each seismic trace according to the three-dimensional seismic data; finding a maximum point of an amplitude of the waveform of each seismic trace, wherein each maximum point of the amplitude corresponds to one horizon extreme point; and constructing a sample space according to the maximum point of the amplitude that is found out.

In an alternative implementation, the computer-readable storage medium provided in the embodiments of the present disclosure stores a computer program executing the following methods of: equally dividing the sample space into a plurality of sub-spaces with overlapping portions; performing a clustering process on the horizon extreme points in each sub-space based on a DBSCAN clustering algorithm, to trace out the horizon extreme points corresponding to each horizon in each sub-space; judging whether the number of the horizon extreme points shared by the overlapping portions of two adjacent sub-spaces exceeds a preset threshold value; and fusing the two adjacent sub-spaces having the number of horizon extreme points shared by the overlapping portions exceeds the preset threshold value, to obtain the horizon fragments corresponding to each horizon of three-dimensional seismic data.

In an alternative implementation, the computer-readable storage medium provided in the embodiments of the present disclosure stores a computer program executing the following methods of: refining the horizon fragments on each horizon curved surface into line segments, wherein one horizon curved surface is a curved surface on which all horizon extreme points of one horizon are located; removing intersection points between the line segments on each horizon curved surface; refining the line segments on each horizon curved surface on which the intersection points are removed, into feature points; adding different labels to different feature points on each horizon curved surface; back-propagating the labels of the feature points on each horizon curved surface to the corresponding horizon curved surface, to obtain horizon fragments with different labels; and adjusting the horizon fragments with different labels on each horizon curved surface to be topologically consistent.

In an alternative implementation, the computer-readable storage medium provided in the embodiments of the present disclosure stores a computer program executing the following methods of: establishing an overlap table, wherein the overlap table is used to record an overlap between the horizon fragments with different labels on each horizon curved surface; recognizing horizon fragments with inconsistent topologies in the overlap table; deleting the horizon fragments with inconsistent topologies in the overlap table; and topologically sorting the remaining horizon fragments in the overlap table.

In an alternative implementation, the computer-readable storage medium provided in the embodiments of the present disclosure stores a computer program executing the following methods of: recognizing the horizon fragments as having a local inconsistency if there is a self-overlapping relationship between the horizon fragments with different labels on the curved surface of the same horizon or there is an overlapping relationship between the horizon fragments with different labels on the curved surfaces of upper and lower horizons; and recognizing the horizon fragments as having a global inconsistency if there is a cyclic overlapping relationship between the horizon fragments with different labels on the curved surfaces of multiple horizons.

In an alternative implementation, the computer-readable storage medium provided in the embodiments of the present disclosure stores a computer program executing the following methods of: acquiring an adjacency table, wherein the adjacency table contains horizon fragments connected to each other but having different labels; determining a fusion order of the horizon fragments based on the adjacency table; and fusing the horizon fragments corresponding to each horizon of the three-dimensional seismic data based on the fusion order.

In an alternative implementation, the computer-readable storage medium provided in the embodiments of the present disclosure stores a computer program executing the following methods of: acquiring second horizon fragments to be fused with first horizon fragments, wherein the second horizon fragments are horizon fragments adjacent to the first horizon fragments; judging whether there is a self-overlapping relationship between the second horizon fragments; traversing the overlap table to verify a local consistency of the second horizon fragments if there is no self-overlapping relationship between the second horizon fragments; verifying a global consistency of the second horizon fragments if the verification of the local consistency is passed; fusing the first horizon fragments and the second horizon fragments into one horizon if the verification of the global consistency is passed; and repeating the above steps until all the horizon fragments are fused.

To sum up, in the embodiment of the present disclosure, based on the hierarchical machine learning method, an improved DBSCAN algorithm based on patch-wise is adopted to remove the influence of the local connection between different horizons in the three-dimensional data, so as to avoid a layer crossing phenomenon during tracking. Since a layer crossing phenomenon is avoided and horizon fragmentation occurs, in the disclosure, the fragments can be fused by establishing the topological consistency between the fragments, so as to achieve a better horizon tracking effect.

Persons skilled in the art should understand that, the embodiments of the present disclosure can be provided as a method, a system or a computer program product. Therefore, the present disclosure can adopt the forms of a full hardware example, a full software example, or a combination thereof.

Moreover, the present disclosure can adopt the form of a computer program product that is implemented on one or more computer-usable storage medium (including but not limited to a disk memory, a CD-ROM, an optical memory, and etc.) containing computer-usable program codes.

The disclosure is described with reference to flow diagrams and/or block diagrams of the method, the device (system) and the computer program product according to the embodiments of the disclosure. It should be understood that each flow and/or block in the flow diagrams and/or block diagrams, and a combination thereof can be implemented by computer program instructions. These computer program instructions can be provided to a CPU of a general-purpose computer, a special-purpose computer, an embedded processor or other programmable data processing device to produce a machine, so that a device for achieving functions designated in one or more flows in the flow diagrams and/or one or more blocks in the block diagrams can be generated by the instructions executed by the CPU of the computer or other programmable data processing device.

These computer program instructions can also be stored in a computer-readable memory that can guide a computer or other programmable data processing device to operate in a special way, so that the instructions stored in the computer-readable memory generates a manufactured product including an instruction device which achieves functions designated in one or more flows in the flow diagrams and/or one or more blocks in the block diagrams.

These computer program instructions can also be loaded on a computer or other programmable data processing device, on which a series of operation steps are executed to generate a process achieved by the computer, so that the instructions executed on the computer or other programmable data processing device is provided for being used in the steps of achieving functions designated in one or more flows in the flow diagrams and/or one or more blocks in the block diagrams.

The purpose, technical solution and beneficial effect of the disclosure have been further described in detail in the above specific embodiments, it should be understood that the above contents are merely specific embodiments of the disclosure and are not intended to limit protection scope of the disclosure, and any modifications, equivalent replacements, improvements and the like within the spirit and principle of the present disclosure shall be covered by the protection scope of the present disclosure.

What is claimed is:

1. A seismic full horizon tracking method, comprising:
    acquiring three-dimensional seismic data;
    extracting horizon extreme points from the three-dimensional seismic data to construct a sample space;
    equally dividing the sample space into a plurality of sub-spaces with overlapping portions, and performing a clustering process on the horizon extreme points in each sub-space to obtain horizon fragments corresponding to each horizon of the three-dimensional seismic data;
    establishing a topological consistency between the horizon fragments; and
    fusing the horizon fragments corresponding to each horizon of the three-dimensional seismic data based on the topological consistency, to obtain a full horizon tracking result of the three-dimensional seismic data.

2. The method according to claim 1, wherein after acquiring the three-dimensional seismic data, the method further comprises:
    denoising the three-dimensional seismic data by using a structure-oriented filtering algorithm.

3. The method according to claim 1, wherein said extracting horizon extreme points from the three-dimensional seismic data to construct a sample space comprises:
    determining a seismic waveform corresponding to each seismic trace according to the three-dimensional seismic data;
    finding a maximum point of an amplitude of the waveform of each seismic trace, wherein each maximum point of the amplitude corresponds to one horizon extreme point; and
    constructing a sample space according to the maximum point of the amplitude that is found out.

4. The method according to claim 1, wherein said equally dividing the sample space into a plurality of sub-spaces with overlapping portions, and performing a clustering process on the horizon extreme points in each sub-space to obtain horizon fragments corresponding to each horizon of the three-dimensional seismic data comprises:
    equally dividing the sample space into a plurality of sub-spaces with overlapping portions;
    performing a clustering process on the horizon extreme points in each sub-space based on a DB SCAN clustering algorithm, to trace out the horizon extreme points corresponding to each horizon in each sub-space;
    judging whether the number of the horizon extreme points shared by the overlapping portions of two adjacent sub-spaces exceeds a preset threshold value; and
    fusing the two adjacent sub-spaces having the number of horizon extreme points shared by the overlapping portions exceeds the preset threshold value, to obtain the horizon fragments corresponding to each horizon of three-dimensional seismic data.

5. The method according to claim 1, wherein said establishing a topological consistency between the horizon fragments comprises:
    refining the horizon fragments on each horizon curved surface into line segments, wherein one horizon curved surface is a curved surface on which all horizon extreme points of one horizon are located;
    removing intersection points between the line segments on each horizon curved surface;
    refining the line segments on each horizon curved surface on which the intersection points are removed, into feature points;
    adding different labels to different feature points on each horizon curved surface;
    back-propagating the labels of the feature points on each horizon curved surface to the corresponding horizon curved surface, to obtain horizon fragments with different labels; and
    adjusting the horizon fragments with different labels on each horizon curved surface to be topologically consistent.

6. The method according to claim 5, wherein said adjusting the horizon fragments with different labels on each horizon curved surface to be topologically consistent comprises:
    establishing an overlap table, wherein the overlap table is used to record an overlap between the horizon fragments with different labels on each horizon curved surface;
    recognizing horizon fragments with inconsistent topologies in the overlap table;

deleting the horizon fragments with inconsistent topologies in the overlap table; and topologically sorting the remaining horizon fragments in the overlap table.

7. The method according to claim 6, wherein said recognizing horizon fragments with inconsistent topologies in the overlap table comprises:

recognizing the horizon fragments as having a local inconsistency if there is a self-overlapping relationship between the horizon fragments with different labels on the curved surface of the same horizon or there is an overlapping relationship between the horizon fragments with different labels on the curved surfaces of upper and lower horizons; and recognizing the horizon fragments as having a global inconsistency if there is a cyclic overlapping relationship between the horizon fragments with different labels on the curved surfaces of multiple horizons.

8. The method according to claim 7, wherein said fusing the horizon fragments corresponding to each horizon of the three-dimensional seismic data based on the topological consistency, to obtain a full horizon tracking result of the three-dimensional seismic data comprises:

acquiring an adjacency table, wherein the adjacency table contains horizon fragments connected to each other but having different labels;

determining a fusion order of the horizon fragments based on the adjacency table; and fusing the horizon fragments corresponding to each horizon of the three-dimensional seismic data based on the fusion order.

9. The method according to claim 8, wherein said fusing the horizon fragments corresponding to each horizon of the three-dimensional seismic data based on the fusion order comprises:

acquiring second horizon fragments to be fused with first horizon fragments, wherein the second horizon fragments are horizon fragments adjacent to the first horizon fragments;

judging whether there is a self-overlapping relationship between the second horizon fragments;

traversing the overlap table to verify a local consistency of the second horizon fragments if there is no self-overlapping relationship between the second horizon fragments;

verifying a global consistency of the second horizon fragments if the verification of the local consistency is passed;

fusing the first horizon fragments and the second horizon fragments into one horizon if the verification of the global consistency is passed; and repeating the above steps until all the horizon fragments are fused.

10. A computer device comprising a memory, a processor and a computer program stored on the memory and executable on the processor, wherein when executing the computer program, the processor implements the following methods of:

acquiring three-dimensional seismic data;

extracting horizon extreme points from the three-dimensional seismic data to construct a sample space;

equally dividing the sample space into a plurality of sub-spaces with overlapping portions, and performing a clustering process on the horizon extreme points in each sub-space to obtain horizon fragments corresponding to each horizon of the three-dimensional seismic data;

establishing a topological consistency between the horizon fragments; and fusing the horizon fragments corresponding to each horizon of the three-dimensional seismic data based on the topological consistency, to obtain a full horizon tracking result of the three-dimensional seismic data.

11. The computer device according to claim 10, wherein when executing the computer program, the processor further implements the following methods of:

determining a seismic waveform corresponding to each seismic trace according to the three-dimensional seismic data;

finding a maximum point of an amplitude of the waveform of each seismic trace, wherein each maximum point of the amplitude corresponds to one horizon extreme point; and constructing a sample space according to the maximum point of the amplitude that is found out.

12. The computer device according to claim 10, wherein when executing the computer program, the processor further implements the following methods of:

equally dividing the sample space into a plurality of sub-spaces with overlapping portions;

performing a clustering process on the horizon extreme points in each sub-space based on a DB SCAN clustering algorithm, to trace out the horizon extreme points corresponding to each horizon in each sub-space;

judging whether the number of the horizon extreme points shared by the overlapping portions of two adjacent sub-spaces exceeds a preset threshold value; and fusing the two adjacent sub-spaces having the number of horizon extreme points shared by the overlapping portions exceeds the preset threshold value, to obtain the horizon fragments corresponding to each horizon of three-dimensional seismic data.

13. The computer device according to claim 10, wherein when executing the computer program, the processor further implements the following methods of:

refining the horizon fragments on each horizon curved surface into line segments, wherein one horizon curved surface is a curved surface on which all horizon extreme points of one horizon are located;

removing intersection points between the line segments on each horizon curved surface;

refining the line segments on each horizon curved surface on which the intersection points are removed, into feature points;

adding different labels to different feature points on each horizon curved surface;

back-propagating the labels of the feature points on each horizon curved surface to the corresponding horizon curved surface, to obtain horizon fragments with different labels; and adjusting the horizon fragments with different labels on each horizon curved surface to be topologically consistent.

14. The computer device according to claim 13, wherein when executing the computer program, the processor further implements the following methods of:

establishing an overlap table, wherein the overlap table is used to record an overlap between the horizon fragments with different labels on each horizon curved surface;

recognizing horizon fragments with inconsistent topologies in the overlap table;

deleting the horizon fragments with inconsistent topologies in the overlap table; and topologically sorting the remaining horizon fragments in the overlap table;

wherein said recognizing horizon fragments with inconsistent topologies in the overlap table comprises:

recognizing the horizon fragments as having a local inconsistency if there is a self-overlapping relationship between the horizon fragments with different labels on the curved surface of the same horizon or there is an overlapping relationship between the horizon fragments with different labels on the curved surfaces of upper and lower horizons; and recognizing the horizon fragments as having a global inconsistency if there is a cyclic overlapping relationship between the horizon fragments with different labels on the curved surfaces of multiple horizons.

15. The computer device according to claim 14, wherein when executing the computer program, the processor further implements the following methods of:

acquiring an adjacency table, wherein the adjacency table contains horizon fragments connected to each other but having different labels;

determining a fusion order of the horizon fragments based on the adjacency table; and fusing the horizon fragments corresponding to each horizon of the three-dimensional seismic data based on the fusion order.

16. The computer device according to claim 15, wherein when executing the computer program, the processor further implements the following methods of:

acquiring second horizon fragments to be fused with first horizon fragments, wherein the second horizon fragments are horizon fragments adjacent to the first horizon fragments;

judging whether there is a self-overlapping relationship between the second horizon fragments;

traversing the overlap table to verify a local consistency of the second horizon fragments if there is no self-overlapping relationship between the second horizon fragments;

verifying a global consistency of the second horizon fragments if the verification of the local consistency is passed;

fusing the first horizon fragments and the second horizon fragments into one horizon if the verification of the global consistency is passed; and repeating the above steps until all the horizon fragments are fused.

17. A non-transitory computer-readable storage medium, wherein the computer-readable storage medium stores a computer program executing the following methods:

acquiring three-dimensional seismic data;

extracting horizon extreme points from the three-dimensional seismic data to construct a sample space;

equally dividing the sample space into a plurality of sub-spaces with overlapping portions, and performing a clustering process on the horizon extreme points in each sub-space to obtain horizon fragments corresponding to each horizon of the three-dimensional seismic data;

establishing a topological consistency between the horizon fragments; and fusing the horizon fragments corresponding to each horizon of the three-dimensional seismic data based on the topological consistency, to obtain a full horizon tracking result of the three-dimensional seismic data.

18. The non-transitory computer-readable storage medium according to claim 17, wherein the computer-readable storage medium stores a computer program executing the following methods:

determining a seismic waveform corresponding to each seismic trace according to the three-dimensional seismic data;

finding a maximum point of an amplitude of the waveform of each seismic trace, wherein each maximum point of the amplitude corresponds to one horizon extreme point; and constructing a sample space according to the maximum point of the amplitude that is found out.

19. The non-transitory computer-readable storage medium according to claim 17, wherein the computer-readable storage medium stores a computer program executing the following methods:

equally dividing the sample space into a plurality of sub-spaces with overlapping portions;

performing a clustering process on the horizon extreme points in each sub-space based on a DB SCAN clustering algorithm, to trace out the horizon extreme points corresponding to each horizon in each sub-space;

judging whether the number of the horizon extreme points shared by the overlapping portions of two adjacent sub-spaces exceeds a preset threshold value; and fusing the two adjacent sub-spaces having the number of horizon extreme points shared by the overlapping portions exceeds the preset threshold value, to obtain the horizon fragments corresponding to each horizon of three-dimensional seismic data.

20. The non-transitory computer-readable storage medium according to claim 17, wherein the computer-readable storage medium stores a computer program executing the following methods:

refining the horizon fragments on each horizon curved surface into line segments, wherein one horizon curved surface is a curved surface on which all horizon extreme points of one horizon are located;

removing intersection points between the line segments on each horizon curved surface;

refining the line segments on each horizon curved surface on which the intersection points are removed, into feature points;

adding different labels to different feature points on each horizon curved surface;

back-propagating the labels of the feature points on each horizon curved surface to the corresponding horizon curved surface, to obtain horizon fragments with different labels; and adjusting the horizon fragments with different labels on each horizon curved surface to be topologically consistent.

* * * * *